United States Patent Office 3,158,440
Patented Nov. 24, 1964

3,158,440
PRODUCTION OF POTASSIUM BICARBONATE
Alfred F. Nylander, Carlsbad, N. Mex., assignor to International Minerals & Chemical Corporation, a corporation of New York
No Drawing. Filed Nov. 8, 1960, Ser. No. 67,910
12 Claims. (Cl. 23—64)

The present invention generally relates to the production of potassium bicarbonate. More particularly it relates to the carbonation of aqueous solutions of potassium carbonate in the present of an alkyl sulfonate to product potassium bicarbonate.

Potassium carbonate ($K_2CO_3$) and potassium bicarbonate ($KHCO_3$) are common chemicals of commerce and both chemicals have many well known uses. Potassium bicarbonate is widely used in baking powders and fire extinguisher powders.

Potassium bicarbonate may be prepared by passing carbon dioxide into an aqueous solution of a water soluble potassium compound, such as potassium carbonate, at conditions effective to produce the bicarbonate. While the prior art processes have been studied extensively, they are still relatively inefficient and the conversion to the bicarbonate in the prior art processes is slow. The present invention is directed to improving the prior art carbonation processes.

Accordingly, it is an object of the present invention to provide an improved process for producing potassium bicarbonate.

It is a further object to provide an efficient process for producing potassium bicarbonate by carbonating an aqueous solution of potassium carbonate with a carbon dioxide-containing gas.

It is a specific object of the invention to provide an efficient process for producing potassium bicarbonate from potassium carbonate by carbonating an aqueous solution of potassium carbonate with a carbon dioxide-containing gas in the presence of an alkyl sulfonate.

These and other objects and advantages of the present invention will be apparent from the description of the invention.

Generally described, the present invention is a process for the production of potassium bicarbonate which comprises treating an aqueous solution of a water soluble potassium salt with carbon dioxide in the present of an alkyl sufonate.

The present invention is an improvement in the prior art processes in which an aqueous solution of a water soluble potassium salt is treated with carbon dioxide at conditions effective to form the bicarbonate and the invention generally embraces improving any of such prior art processes. The invention finds particular application in improving the prior art processes in which an aqueous solution of potassium carbonate is reacted with carbon dioxide at conditions effective to produce the bicarbonate. These conditions which are effective to produce the bicarbonate are well known in the art and are generally embraced in this invention.

The present invention is based on the discovery that the prior art carbonation processes, which produce potassium bicarbonate by carbonating an aqueous solution of a water soluble potassium salt, are improved when the carbonating is effected in the presence of an alkyl sulfonate.

The aqueous solution to be carbonated may be any of the solutions used in the prior art processes. As hereinbefore set forth the invention finds particular application when an aqueous solution of potassium carbonate is carbonated. The solutions are preferably concentrated and more preferably substantially saturated. Concentrated and substantially saturated aqueous solutions of potassium carbonate have been efficiently reacted with carbon dioxide in the process of the present invention.

The aqueous solution is carbonated with any suitable carbon dioxide-containing material; preferably with a carbon dioxide-containing gas. The gas, or other material, however, of course, preferably does not contain other constituents which would react with the potassium in the aqueous solution at the conditions employed to form other compounds which would precipitate with the potassium bicarbonate and contaminate the potassium bicarbonate. Substantially pure carbon dioxide may be used as well as flue gasses, mixtures of carbon dioxide with air, nitrogen, carbon monoxide, etc. The gas utilized preferably contains at least 2% by volume of carbon dioxide.

The reaction of the aqueous solution of potassium carbonate with the carbon dioxide takes place at operating conditions that may be employed in the prior art processes of this type. Ambient temperatures may be used although higher or lower temperatures may be used when desired. The temperature is, however, below that at which decomposition of the alkyl sulfonate employed takes place; the temperature is, therefore, one at which the alkyl sulfonate is stable. Atmospheric pressure may be used as well as subatmospheric and super-atmospheric pressures. Superatmospheric pressures are preferred since, in general, the reaction proceeds at a faster rate at higher pressures.

In accordance with the present invention the reaction of the aqueous solution of the water soluble potassium compound with carbon dioxide is effected in the presence of an alkyl sulfonate. Any suitable alkyl sulfonate or alkyl-aryl sulfonate may be used. Suitable sulfonates are detergent sulfonates, that is those which may be used as detergents. Sulfonates with a single large alkyl chain of 12 to 18 carbon atoms together with a small ring structure, such as benzene, are suitable. Sulfonates having a large ring structure, such as naphthalene, or a plurality of short alkyl chains may also be used. Specific examples of suitable sulfonates are $C_{12}H_{25}(C_6H_4)SO_3Na$, which is sold by Monsanto Chemical Company under the trademark Santomerse, sodium lauryl sulfobenzoate ($NaO_3S(C_6H_4)COOC_{12}H_{25}$) and monoethyl phenyl sodium monosulfonate. The sodium and potassium sulfonates are specifically suitable. A specifically preferred sulfonate of this type is the sodium salt of a sulfonate of oleic acid sold by the Tennessee Corporation under the trademark Sul-Fon-Ate OA–5. The alkyl-aryl sulfonates and alkyl sulfonates which are designed especially for use as detergents in acidic media are specifically preferred.

The invention contemplates the utilization of essentially pure sulfonates, preferably the sodium and potassium salts thereof, mixtures of these materials, as well as mixtures containing these materials. The sulfonate used is, preferably, substantially water soluble and is preferably in solution in the aqueous solution of the soluble potassium salt to be carbonated.

The sulfonates are effective to some degree in substantially all proportions such that the relative amounts thereof do not constitute the sole essential feature of the invention. The practical upper limit of sulfonate used is determined to a significant extent by economic considerations including cost, and, of course, an amount of sulfonate greater than necessary to achieve a maximum carbonation rate is economically impractical. Normally, the sulfonates are employed in a minor amount of from about 0.001 to about 5% by weight of the aqueous solution of the potassium salt to be carbonated.

In order to give a fuller understanding of the invention but with no intention to be limited thereto, the following specific example is given.

Example

A 2000 gram portion of an aqueous solution containing 40.5% by weight of $K_2CO_3$ and 5.0% $KHCO_3$ was carbonated by bubbling a gas mixture of 10% $CO_2$ and 90% air by volume through the solution at ambient temperature.

In another test, another 2000 gram portion of the same aqueous solution was carbonated in the same manner except that in this test 0.1% by weight of a detergent sulfonate, specifically the sodium salt of a sulfonate of oleic acid, sold by the Tennessee Corporation under the trademark Sul-Fon-Ate OA-5, was dissolved in the aqueous solution. In each test the carbonation was continued for about 6 hours at a gas rate of about 0.02 cubic foot per minute.

During the carbonation solid crystals of potassium bicarbonate formed in the solution. After carbonation, the solid products were filtered from the solution and air dried at room temperature. The following data was obtained from these comparative carbonation experiments.

|  | Wt. in Grams | Percent $K_2CO_3$ | Percent $KHCO_3$ | Wt. $CO_2$ Absorbed |
|---|---|---|---|---|
| Feed Solutions | 2,000 | 40.5 | 5.0 | 0.0 |
| I. After Carbonation with no additive: | | | | |
| Aqueous Phase | 1,964 | 39.8 | 5.0 | 0.0 |
| Solid Phase | 50 | 5.1 | 87.7 | 14.0 |
| Total | | 44.9 | 92.7 | 14.0 |
| II. After Carbonation with 0.1% detergent sulfonate: | | | | |
| Aqueous Phase | 1,927 | 37.9 | 6.3 | 8.3 |
| Solid Phase | 111 | 6.6 | 84.6 | 30.0 |
| Total | | 44.5 | 90.9 | 38.3 |

The invention, as illustrated by the foregoing example, affords an efficient and economical method for the rapid carbonation of potassium carbonate to form potassium bicarbonate. The sulfonates utilized are inexpensive. The invention accordingly represents a significant contribution to the art.

The description of the invention utilized specific reference to certain process details; however, it is to be understood that such details are illustrative only and not by way of limitation. Other modifications and equivalents of the invention will be apparent to those skilled in the art from the foregoing description.

I claim:

1. In a process for the preparation of potassium bicarbonate in which an aqueous solution containing at least about 40 weight percent up to saturation of a water soluble potassium salt is treated with carbon dioxide, the improvement which comprises effecting the treating in the presence of a detergent sulfonate selected from the group consisting of alkyl sulfonates and alkylaryl sulfonates.

2. The improvement of claim 1 in which said sulfonate comprises a sodium alkyl sulfonate.

3. The improvement of claim 1 in which said sulfonate comprises a potassium alkyl sulfonate.

4. The improvement of claim 1 in which said sulfonate comprises the sodium salt of a sulfonate of oleic acid.

5. The process of claim 1 wherein said water soluble potassium salt comprises potassium carbonate.

6. The improvement of claim 1 wherein said detergent sulfonate is used in an amount within the range of from about 0.001% to about 5% by weight of the aqueous solution.

7. The improvement of claim 1 wherein said detergent sulfonate is substantially water soluble.

8. The improvement of claim 1 wherein said detergent sulfonate comprises an alkyl-aryl sulfonate.

9. In a process for the preparation of potassium bicarbonate in which an aqueous solution containing at least about 40 weight percent up to saturation of potassium carbonate is carbonated with carbon dioxide at conditions effective to produce the bicarbonate, the improvement which comprises effecting the carbonating in the presence of a substantially water soluble alkyl-aryl sulfonate.

10. The improvement of claim 9 in which said sulfonate comprises a sodium alkyl-aryl sulfonate.

11. The improvement of claim 9 in which said sulfonate comprises a potassium alkyl-aryl sulfonate.

12. The improvement of claim 9 wherein said alkyl-aryl sulfonate is used in an amount within the range of from about 0.001% to about 5.0% by weight of the aqueous solution.

References Cited in the file of this patent

UNITED STATES PATENTS

| 835,771 | Behrens | Nov. 13, 1906 |
| 2,256,962 | Reich | Sept. 23, 1941 |
| 2,607,660 | Robertson | Aug. 19, 1952 |
| 2,954,282 | Bauer | Sept. 27, 1960 |

OTHER REFERENCES

Mellor: "A Comprehensive Treatise on Inorganic and Theoretical Chem.," vol. 6, 1925, page 48.

Killeffer: "Industrial and Engineering Chem.," vol. 29, No. 11, November 1937, page 1293.